US009047522B1

(12) United States Patent
Nikitin et al.

(10) Patent No.: US 9,047,522 B1
(45) Date of Patent: *Jun. 2, 2015

(54) UTILIZATION OF MOTION AND SPATIAL IDENTIFICATION IN MOBILE RFID INTERROGATOR

(75) Inventors: Pavel V. Nikitin, Seattle, WA (US); Gary Neal Spiess, Lisbon, IA (US); Hunter Martin Leland, Cedar Rapids, IA (US); Lynn Carl Hingst, Center Point, IA (US); John Howland Sherman, Crystal Lake, IL (US)

(73) Assignee: INTERMEC IP CORP., Everett, WA (US)

( * ) Notice: Subject to any disclaimer, the term of this patent is extended or adjusted under 35 U.S.C. 154(b) by 1181 days.

This patent is subject to a terminal disclaimer.

(21) Appl. No.: 12/941,043

(22) Filed: Nov. 6, 2010

Related U.S. Application Data

(63) Continuation-in-part of application No. 12/371,429, filed on Feb. 13, 2009, now Pat. No. 8,237,563, and a continuation-in-part of application No. 12/765,865, filed on Apr. 23, 2010, now abandoned.

(Continued)

(51) Int. Cl.
*G06K 7/10* (2006.01)

(52) U.S. Cl.
CPC ........ *G06K 7/10108* (2013.01); *G06K 7/10009* (2013.01); *G06K 7/10356* (2013.01)

(58) Field of Classification Search
CPC .................... G06K 7/0008; G06K 2017/0045; G06K 7/00; G06K 7/10376; G01S 13/878; G08B 13/2417; G01V 15/00; A63B 2220/803; A63B 2225/54
USPC ................ 340/10.1, 10.2, 10.3, 10.31, 10.32, 340/10.4, 10.41, 10.42, 572.1
See application file for complete search history.

(56) References Cited

U.S. PATENT DOCUMENTS 6,204,765 B1    3/2001   Brady et al.
(Continued)

FOREIGN PATENT DOCUMENTS

JP           2003296666       * 10/2003
(Continued)

OTHER PUBLICATIONS

"Assessment of the Physical Interface of UHF Passive Tags for Localization", Yanakiev et al., Eurasip RFID 2007 workshop.
(Continued)

*Primary Examiner* — Jennifer Mehmood
*Assistant Examiner* — Yong Hang Jiang
(74) *Attorney, Agent, or Firm* — Oliff PLC; R. Brian Drozd

(57) ABSTRACT

An RFID system is used to detect whether an RFID tag is part of the load of a forklift or other transport device. In one aspect where the load is in motion relative to an RFID reader system, the RFID system obtains tag readings and derives tag vector motion information which can be compared to the known motion of the load to distinguish tags that are part of the load from false positives which are unavoidably also within the field of the reader system. A forklift antenna system may also make readings from load pickup to load deposit in a truck trailer, and utilize computed tag vector motion information to distinguish tags that are part of the load from false positives. The tag vector information my relate to tag velocity, tag acceleration, and/or rate of change of tag acceleration. The two components of the RFID system may communicate information on identified tags, and/or interact (e.g. by silencing tags), so as to cooperate in identifying true positive tags in the load. A portal or reader system location along the path of the forklift can be activated prior to arrival of the load to eliminate certain false positives from requiring evaluation while the forklift load is moving through the field region of such reader system. Vertical motion of the load can be utilized as a way of discriminating between true positive tags in the load and false positives.

20 Claims, 10 Drawing Sheets

Related U.S. Application Data

(60) Provisional application No. 61/400,679, filed on Jul. 31, 2010, provisional application No. 61/028,626, filed on Feb. 14, 2008, provisional application No. 61/179,361, filed on May 18, 2009, provisional application No. 61/231,297, filed on Aug. 4, 2009, provisional application No. 61/232,427, filed on Aug. 8, 2009, provisional application No. 61/279,813, filed on Oct. 26, 2009, provisional application No. 61/340,198, filed on Mar. 13, 2010.

(56) References Cited

U.S. PATENT DOCUMENTS

| | | | |
|---|---|---|---|
| 6,476,756 | B2 | 11/2002 | Landt |
| 6,600,443 | B2 | 7/2003 | Landt |
| 6,909,366 | B1 | 6/2005 | Marsh et al. |
| 7,030,761 | B2 | 4/2006 | Bridgelall et al. |
| 7,119,738 | B2 | 10/2006 | Bridgelall et al. |
| 7,170,412 | B2 | 1/2007 | Knox et al. |
| 7,323,977 | B2 | 1/2008 | Kodukula et al. |
| 7,567,179 | B2 | 7/2009 | Stephensen et al. |
| 7,962,308 | B2 * | 6/2011 | Makino .................. 702/141 |
| 8,237,563 | B2 | 8/2012 | Schatz et al. |
| 8,248,210 | B2 | 8/2012 | Nikitin et al. |
| 2002/0183882 | A1* | 12/2002 | Dearing et al. ............ 700/115 |
| 2004/0030476 | A1* | 2/2004 | Oswald et al. .............. 701/45 |
| 2005/0210360 | A1* | 9/2005 | Friedrich .................. 714/758 |
| 2006/0170565 | A1* | 8/2006 | Husak et al. ............ 340/825.49 |
| 2006/0255951 | A1 | 11/2006 | Roeder et al. |
| 2007/0001814 | A1 | 1/2007 | Steinke et al. |
| 2007/0073513 | A1 | 3/2007 | Posamentier |
| 2007/0099623 | A1* | 5/2007 | Stephensen et al. .......... 455/446 |
| 2007/0109128 | A1 | 5/2007 | Fujii et al. |
| 2007/0197229 | A1 | 8/2007 | Kalliola et al. |
| 2007/0213869 | A1 | 9/2007 | Bandringa et al. |
| 2007/0241904 | A1 | 10/2007 | Ozaki et al. |
| 2007/0273530 | A1 | 11/2007 | Koezuka et al. |
| 2008/0111688 | A1 | 5/2008 | Nikitin et al. |
| 2008/0318682 | A1* | 12/2008 | Rofougaran et al. ........... 463/39 |
| 2009/0021351 | A1 | 1/2009 | Beniyama et al. |
| 2009/0021376 | A1 | 1/2009 | Calvarese |
| 2009/0207024 | A1 | 8/2009 | Schatz et al. |
| 2009/0326709 | A1 | 12/2009 | Hooper et al. |
| 2010/0266381 | A1 | 10/2010 | Chilson et al. |
| 2010/0274641 | A1 | 10/2010 | Allen et al. |
| 2010/0328073 | A1 | 12/2010 | Nikitin et al. |

FOREIGN PATENT DOCUMENTS

| | | |
|---|---|---|
| WO | WO-2005048476 | 5/2005 |
| WO | WO-2007035833 A2 | 3/2007 |
| WO | WO-2007035833 A3 | 6/2007 |

OTHER PUBLICATIONS

"Automated Robot Docking Using Direction Sensing RFID", Kim et al., 2007 IEEE International Conference on Robotics and Automation.

"Localization and Tracking of Passive RFID Tags Based on Direction Estimation", Zhang et al., International Journal of Antennas and Propagation. 2007.

"Omron Announces New Gen 2 Interrogator", http://www.rfidjournal.com/article/articleview/2541/1/1/, Feb. 8, 2006.

"Survey of Wireless Indoor Positioning Techniques and Systems", Liu et al., IEEE Trans. On Syst., Man, Cybernetics, Nov. 2007.

"Tracking Mobile Nodes Using RF Doppler Shifts", Kusy et al., ACM SenSys conference, 2007.

"UHF Gen2 Tag direction," Impinj video http://impinj.com/rfid/in-action-videos.aspx, Mar. 2008.

"A Giant Step for RFID", Mojix, Inc. http://www.moiix.com, copyright 2010, 1 page.

"Alien—Intelligent Tag Radar", www.alientechnology.com/docs/products/AppNote_ITR.pdf, copyright 2008, 3 pages.

"How Mobile RFID Systems Improve Operations and ROI", http://sparkmedialab.com/Intermec/First/ENG/mobile.html, Edition 1, 2007, 3 pages.

"Long Range RF Combat Identification Tag", Spectra Research, http://spectra-research.com/sppdf/Rftag_flyer.pdf, 2005, 2 pages.

"Real Time Locating Systems Using Passive Tags—High Volume RTLS?" IDTechEx, http://www.idtechex.com/research/articles/real_time_locating_systems_using_passive_tags_high_volume_rtls_00001005.asp, copyright 1999-2011, 3 pages.

"RFID-radar™—How it works", Trolley Scan (Proprietary) Ltd., http://rfid-radar.com/howworks.html, accessed May 24, 2011, 5 pages.

RF Controls—Welcome to RF Controls, http://www.rectrls.com, copyright 2008-2011, 1 page.

S5 Systems, "Providing Custom Mobile and Embedded development services", http://www.s5systems.com/products/assettracking.html, accessed May 31, 2011, 1 page.

* cited by examiner

UTILIZATION OF MOTION AND SPATIAL IDENTIFICATION IN MOBILE RFID INTERROGATOR

CROSS-REFERENCE TO RELATED APPLICATIONS

This application is a continuation-in-part of application Ser. No. 12/765,865 filed Apr. 23, 2010, and application Ser. No. 12/371,429 filed Feb. 13, 2009, which was published as US 2009/0207024 A1 dated Aug. 20, 2009, and which claims the benefit of U.S. Provisional Application No. 61/028,626, entitled "UTILIZATION OF MOTION AND SPATIAL IDENTIFICATION IN MOBILE RFID INTERROGATOR", filed Feb. 14, 2008; said application Ser. No. 12/765,865 claims the benefit of U.S. Provisional Applications No. 61/179,361 filed May 18, 2009, No. 61/231,297 filed Aug. 4, 2009, and No. 61/232,427 filed Aug. 8, 2009; this application claims the benefit of U.S. Provisional Applications No. 61/279,813 filed Oct. 26, 2009, No. 61/340,198 filed Mar. 13, 2010, and also claims the benefit of U.S. Provisional Application No. 61/400,679 filed Jul. 31, 2010; all of the foregoing patent applications including said provisional application 61/028,626, said nonprovisional application Ser. No. 12/371, 429, and said published application US 2009/0207024 A1 are hereby incorporated herein by reference in their entirety.

INCORPORATION BY REFERENCE

The following documents are hereby incorporated herein by reference in their entirety: application Ser. No. 12/371,429 filed Feb. 13, 2009, which was published as US 2009/ 0207024 A1 with a publication date of Aug. 20, 2009; application Ser. No. 11/558,339 filed Nov. 9, 2006, which was published as US 2008/0111688 A1 with a publication date of May 15, 2008; application Ser. No. 11/672,776 filed Feb. 8, 2007, which was published as US 2007/0213869 A1 with a publication date of Sep. 13, 2007; Pavel Nikitin et al application Ser. No. 12/495,732 filed Feb. 13, 2009; application Ser. No. 12/765,865 filed Apr. 23, 2010; U.S. Provisional Application No. 61/028,626 filed Feb. 14, 2008; U.S. Provisional Application No. 61/179,361 filed May 18, 2009; U.S. Provisional Application No. 61/231,297 filed Aug. 4, 2009; U.S. Provisional Application No. 61/232,427 filed Aug. 8, 2009; U.S. Provisional Application No. 61/279,813 filed Oct. 26, 2009; U.S. Provisional Application No. 61/340,198 filed Mar. 13, 2010, and "Phase Based Spatial Identification of UHF RFID Tags" by Nikitin, Martinez, Ramamurthy, Leland, Spiess, and Rao, presented at the IEEE RFID Conference at Orlando, Fla., Apr. 14-16, 2010 (Available to the public via IEEEXplore—identifier code 978-1-4244-5744-1/10/$26, copyright 2010 IEEE).

DETAILED DESCRIPTION

RFID systems encounter difficulties in determining which tagged items are loaded on forklifts and other types of mobile vehicles and which are not. Under certain conditions RFID readers may read tags which are far away, as legitimately loaded items. Extraneous tag reads like these are difficult to filter out, and introduce significant inaccuracies into the system.

Various aspects of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. The term "forklift" is used herein generically to apply to devices for moving RFID tags whether guided by a human operator or robotically. Certain terms may even be emphasized below; however, any terminology intended to be interpreted in any restricted manner will be overtly and specifically defined as such in this Detailed Description section.

It would be useful to know the location of RFID-tagged packages in places like warehouses or distribution centers where there are a large number of tagged packages. In addition, the packages may be moved from one location to another, for example, to complete orders, to place packages into an order processing queue, or to assemble a cargo in a truck trailer or the like. Forklifts may be used to move large quantities of tagged packages. An RFID reader, whether mobile or stationary, may under certain conditions erroneously read and identify an extraneous tag as part of the forklift load when the tag is actually located on a shelf or elsewhere in the warehouse, or already on a truck trailer. Thus, there is a need for a system that can reliably provide information, for example to a forklift operator or to a database, as to what is being carried on a particular forklift load.

Figure 1:
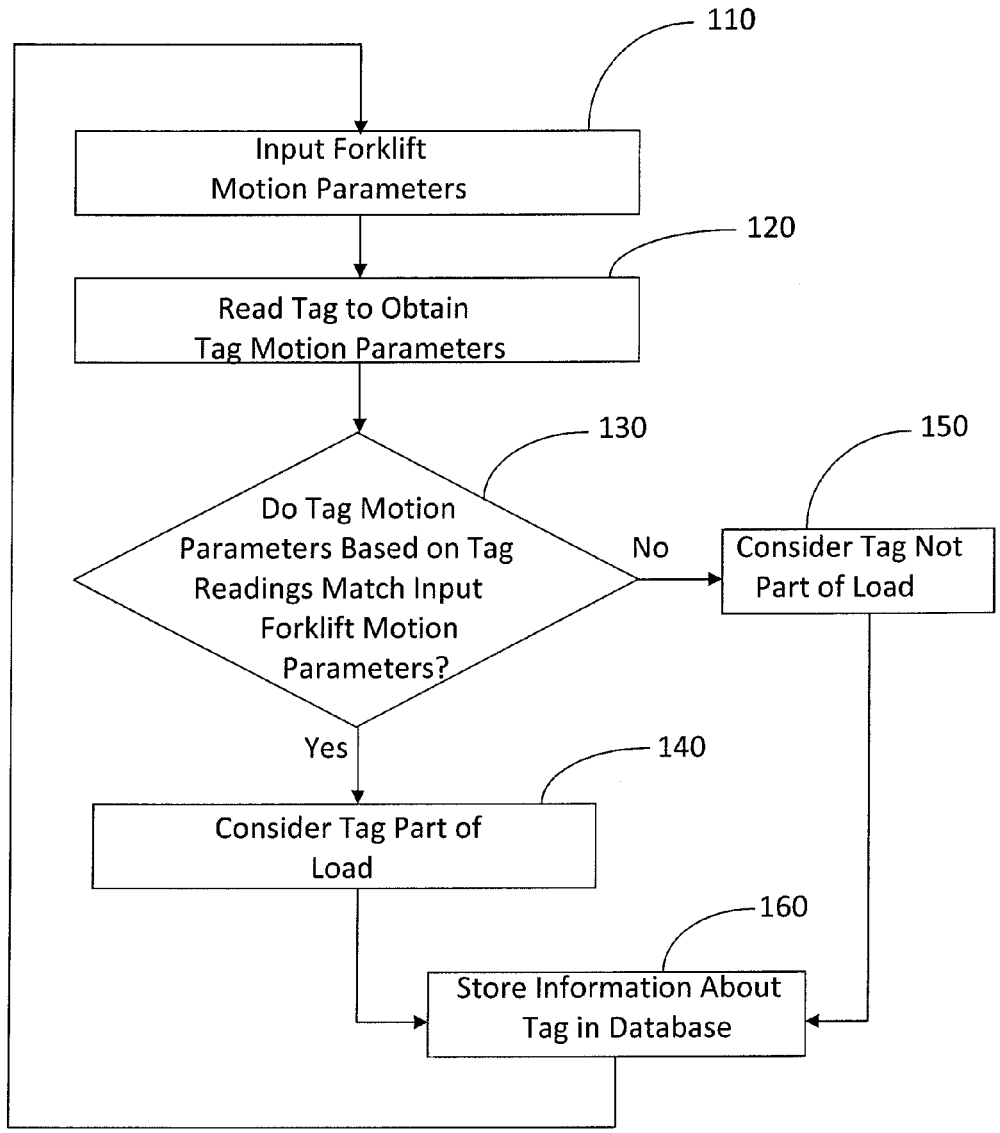
FIG. 1 is a flow diagram illustrating an example of a method of determining which RFID-tagged packages are on a forklift using a forklift motion parameter input and tag motion parameters obtained by a portal reader system or the like arranged along the path of movement of the forklift.

Description of FIG. 1

FIG. 1 illustrates an example process for distinguishing between RFID tags which are part of RFID-tagged packages on a forklift, and extraneous RFID tags within the read zone of a RFID reader located along the path of the forklift, and seeking to identify the tagged packages. At block 110, the forklift motion parameter input may comprise one, two or all of the scalar quantities velocity, acceleration, and the derivative of acceleration with respect to time (known as jerk), and/or one, two or all of the vector values of velocity, acceleration, or jerk. The forklift motion parameters may be obtained from a one-axis, two-axis or three-axis accelerometer on the forklift.

The tag motion values may be obtained by tag readings taken at 120 using the time domain phase difference of arrival (TD-PDOA) method described e.g. in Section III of the incorporated technical paper "Phase Based Spatial Identification of UHF RFID Tags" by Nikitin, et al. It is useful to have phase measurements from several antennas simultaneously as described in reference to FIG. 9 in order to compute the tag vector parameters. Comparing forklift and tag velocity, acceleration, and jerk will allow one to conclude whether the tag is stray or not. This applies to scalar quantities of velocity, acceleration and jerk, as well as to the vector quantities.

At decision point 130, it is determined whether the tag read by the RFID reader has a calculated tag motion parameter, e.g. based on tag readings from a plurality of antennas, that matches the input forklift motion parameter defined at block 110. The forklift motion parameter input at block 110 may be determined in many ways. For example, the forklift may have an on-board motion sensor e.g. an accelerometer, and readings may be telemetered to the reader installation. Preferably the accelerometer readings are sent by a wireless link to the non-moving reader installation sufficiently frequently so that the variation of the accelerometer output as a function of time can be reconstructed at the reader installation with substantial accuracy. Alternatively, the RFID reader installation may include a radiant energy speed sensor such as a radar type device positioned to monitor the travel of the forklift during the process of FIG. 1. The process of FIG. 1 may be activated and deactivated by forklift position sensors (e.g. using photoelectric beams, pneumatic tubes or mechanical pressure actuated switches) that are triggered by the forklift as it approaches and travels through and beyond the reader installation read field. Based upon the readings from the tags per block 120, as the forklift traverses a path with respect to the RFID reader installation, e.g. changes in the phase may be determined e.g. as described in reference to FIG. 9, and utilized to determine apparent tag motion parameters for use in comparison step 130.

If at decision point 130, it is determined (block 130—Yes) that tag motion parameters match input forklift motion parameters, at block 140, the tag, and thus the package to which the tag is attached, is considered part of the forklift load. At block 160, the determination that the tag is considered part of the load is stored in a database for use e.g. in tracking tagged packages transported by the forklift.

If at decision point 130 it is determined (block 130—No) that the tag is not moving in correspondence with the motion parameters of the forklift load, at block 150, the tag and its corresponding package are not considered part of the forklift load. At block 160, the determination that the tag is not considered part of the load can be stored in a database for use by the RFID system The process continues in the same manner by returning to block 110, e.g. with an updated input of forklift motion parameters at block 110 for use in determining whether the next RFID tag is part of the load or not.

Figure 2A:
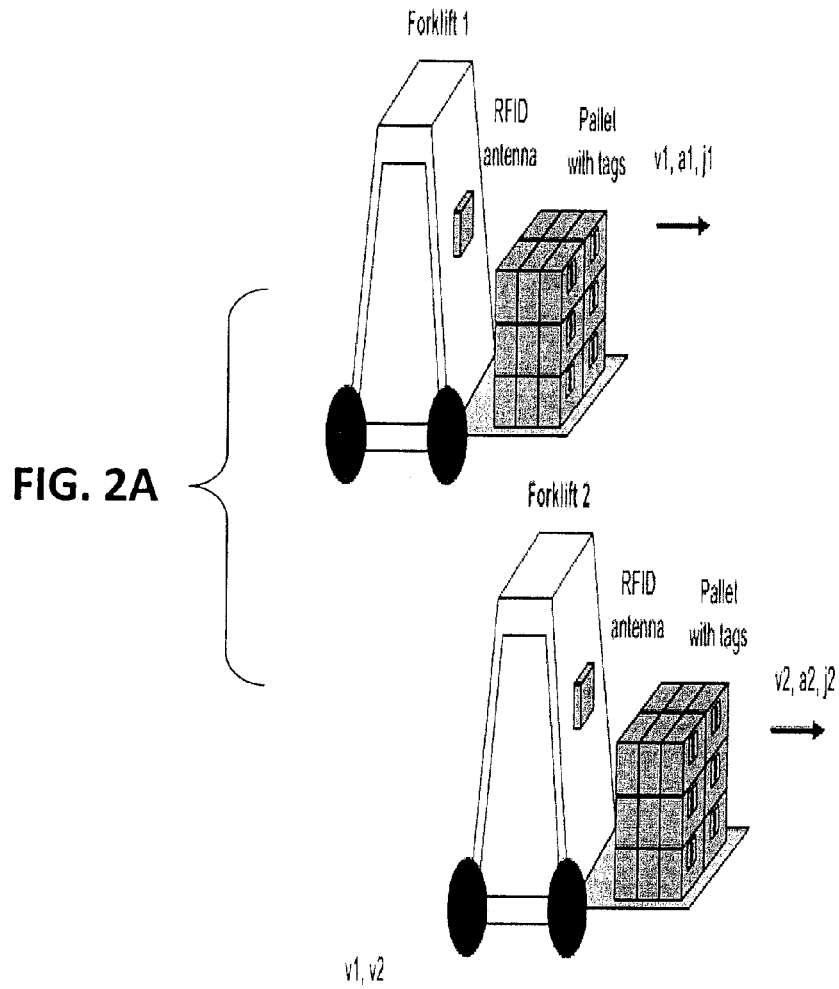
FIG. 2A is a diagram illustrating the case where two forklifts are moving parallel to each other, each with its own pallet of tags, and with similar velocities.
Figure 2B:
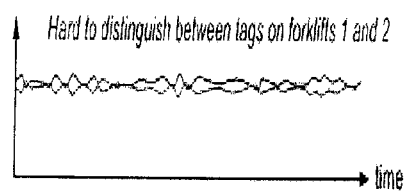
FIG. 2B shows plots of velocity as a function of time for the forklifts of FIG. 2A.
Figure 2C:
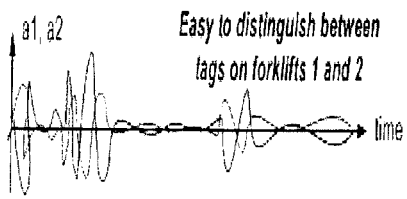
FIG. 2C shows the corresponding acceleration plots as a function of time, illustrating that acceleration motion parameters may provide a basis for distinguishing between tags on the two forklifts when the velocities are closely matched.

Description of FIGS. 2A, 2B and 2C

FIGS. 2A-2C illustrate the case where two forklifts are moving parallel to each other, each with its own pallet of tags, and with similar velocities. FIG. 2B may be taken as illustrating a substantial average velocity of the forklift load relative to a non-moving antenna system, or may illustrate a zero average velocity relative to an antenna system moving with the forklift load. While the velocity values v1 and v2 as a function of time shown in FIG. 2B are hard to distinguish, the acceleration values a1 and a2 as a function of time shown in FIG. 2C are easy to distinguish. Similarly the jerk values (represented at j1 and j2 in FIG. 2A) may be readily distinguished, e.g. as forklift 1 and forklift 2 move through adjacent portals.

Figure 3:
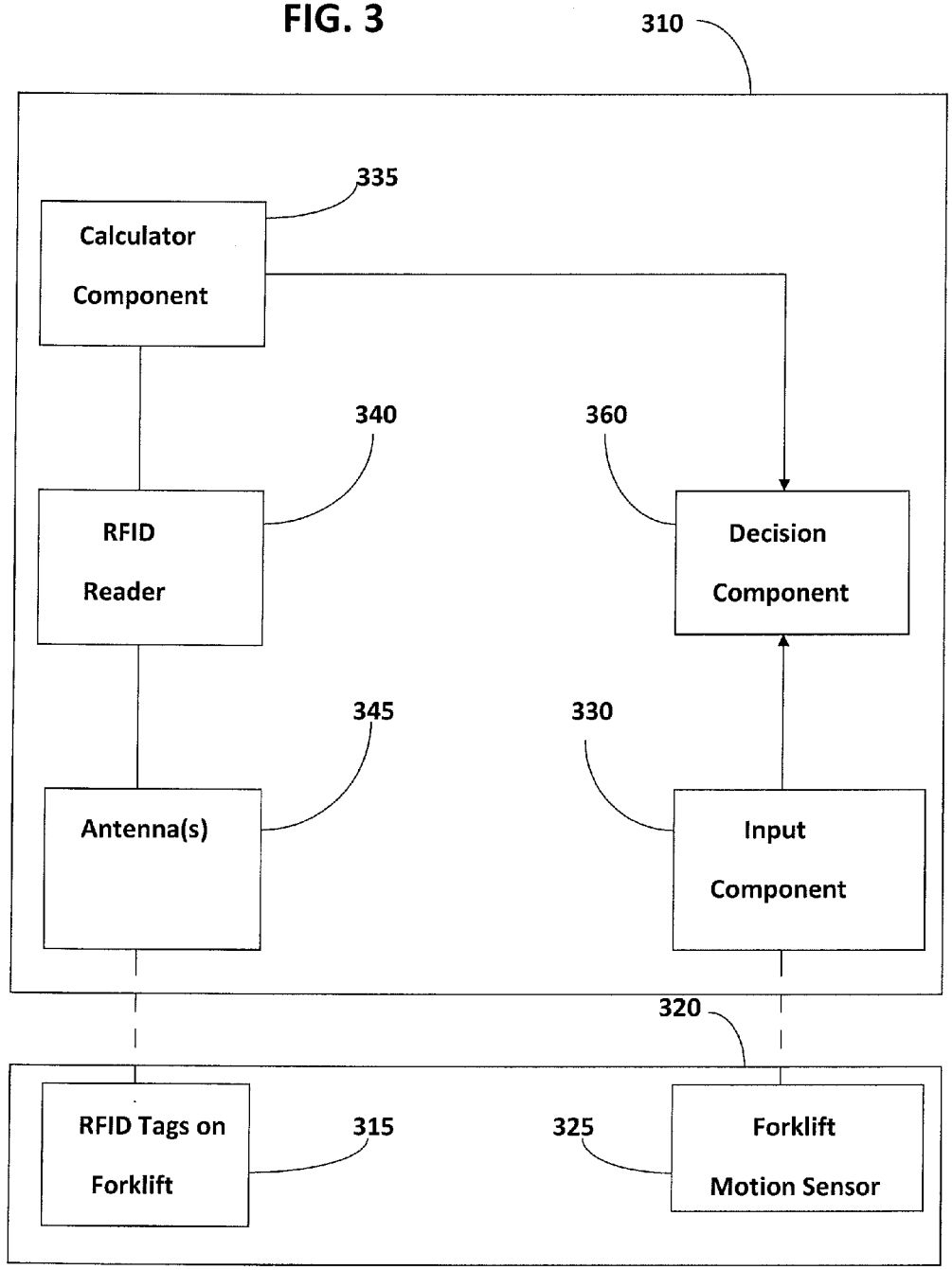
FIG. 3 shows a block diagram illustrating an exemplary system for identifying an RFID tag which is part of a forklift load by comparing tag motion parameters obtained from an RFID tag reader with motion parameters obtained from a motion sensor responsive to forklift movement as the forklift load moves through the field of the RFID reader.
Figure 4:
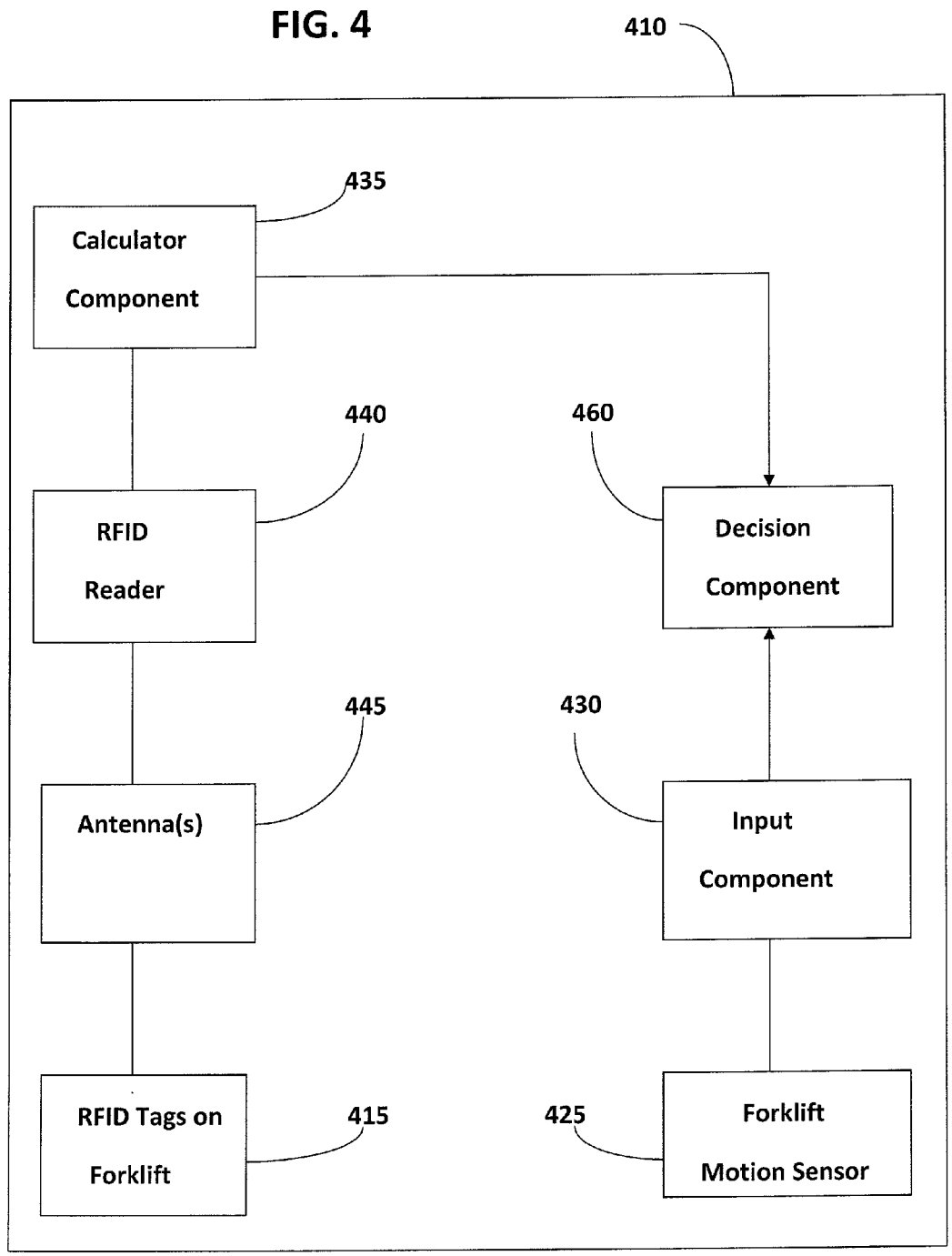
FIG. 4 shows a block diagram of an example computer system that can be used e.g. with a forklift RFID reader to determine which RFID-tagged packages are moving with a forklift.
Figure 5:
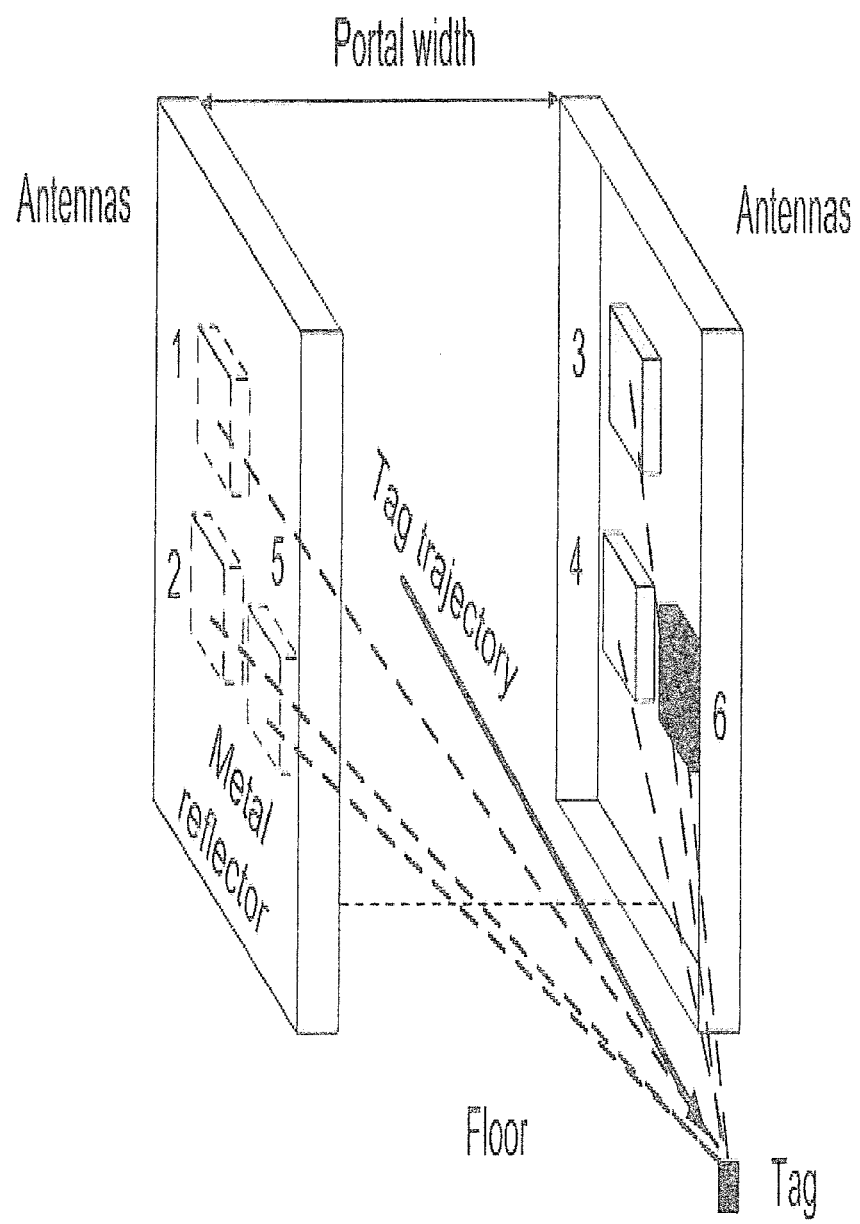
FIG. 5 is a diagrammatic showing of an exemplary antenna arrangement for obtaining motion parameters for tags moving through a portal.

FIGS. 2B and 2C thus illustrate that in the process of FIG. 1, it is advantageous to have a non-moving reader installation such as the portal reader installation of FIGS. 3 and 5 receive motion parameter information from the forklift moving through the installation, from which the acceleration and or jerk of the tags on the forklift pallet can be determined. Thus in step 130 of FIG. 1, the tag acceleration and/or jerk based on tag readings from the antennas 345 of a portal reader installation can be compared with the corresponding acceleration and/or jerk values representing directly the motion of the forklift load based on measurements by the forklift motion sensor 325. Also for the case of an antenna system 445 moving with the forklift load as in FIG. 4, it is advantageous to compare at decision component 460 the acceleration and/or jerk values based on tag measurements with the corresponding values based on measured values for forklift load motion from forklift motion sensor 425 since extraneous tags that are not part of the load will exhibit distinctive values of acceleration and/or jerk even when the average velocities are similar.

Description of FIG. 3

FIG. 3 shows an example block diagram which may represent a portal RFID system 310 used to read one or more packages with RFID tags 315 carried by a transport vehicle such as a forklift 320. With RFID system 310 in FIG. 3, a forklift motion sensor 325 sends data via a wireless link to an input component 330 for processing. For the RFID system in FIG. 3, in one configuration the sensor 325 may comprise a three-axis accelerometer mounted on the backrest for the load; then a sufficiently sensitive sensor can detect motion of the fork moving up and down. In another configuration, the sensor 325 may comprise a two-axis accelerometer for sensing movement of the backrest and load in the horizontal plane. The RFID system 310 in FIG. 3 includes a calculator component 335, an RFID reader 340, and one or more RF antennas 345. The calculator component 335 calculates the tag motion values from the tag readings taken by the RFID reader 340 e.g. using the time domain phase difference of arrival (TD-PDOA) method described e.g. in Section III of the incorporated technical paper "Phase Based Spatial Identification of UHF RFID Tags" by Nikitin, et al. It is useful to have phase measurements from several antennas simultaneously as described in reference to FIG. 9 in order to compute the tag vector parameters.

One example according to FIG. 3 would involve the wireless transmission of the forklift motion information such as forklift tri-axial acceleration components from a tri-axial accelerometer to the input component 330 during the time that the forklift load is within the field of antennas 345. The input component 330 may compute scalar quantities for velocity, acceleration and/or jerk, and/or the vector values for velocity, acceleration and/or jerk, to be compared by means of decision component 360 with corresponding calculated tag values (e.g. of scalar velocity, acceleration and/or jerk, and/or the vector values for velocity, acceleration and/or jerk) obtained from the calculator component 335. Preferably the accelerometer readings are sent by a wireless link to the non-moving reader installation sufficiently frequently so that the variation of the accelerometer output as a function of time (and thus the movement of the forklift backrest, and of the tags in the load) can be reconstructed at the reader installation with substantial accuracy. Components 330, 335 and 360 may be part of the RFID reader system, or a part of a portal computer system connected with the RFID reader.

Description of FIG. 4

FIG. 4 shows an example block diagram which may represent a forklift RFID system 410 used to read RFID tags 415 associated with one or more packages carried by the forklift 410. A forklift motion sensor 425 sends data to an input component 430 for processing. As with the RFID system in FIG. 3, in one configuration the motion sensor 425 may comprise a three-axis accelerometer mounted on the backrest for the load; then a sufficiently sensitive sensor can detect motion of the fork moving up and down. In another configuration, the sensor 425 may comprise a two-axis accelerometer for sensing movement of the backrest and load in a horizontal plane. The RFID system 410 includes an RFID reader 440, and one or more RF antennas 445 which may be mounted on the forklift backrest for coupling with RFID tags 415 in the forklift load. A calculator component 435 may calculate the tag motion values from the tag readings taken by the RFID reader 440 e.g. using the time domain phase difference of arrival (TD-PDOA) method described in reference to FIG. 9. Since the RFID tags 415 on the forklift 410 would move with antennas 445, the relative velocity would be zero. Where values of tag motion based on readings from antennas 445 corresponded with forklift motion, the tag being read would be non-moving, and considered to be a stray. Where the decision component 460 considers e.g. tag velocity and tag acceleration and/or jerk, a tag on another forklift moving at similar speed could be distinguished based e.g. on its different acceleration and/or jerk. It is useful to have phase measurements from several antennas simultaneously as explained in reference to FIG. 9 in order to compute the tag vector parameters. Since the RFID tags 415 on the forklift 410 would move with antennas 445, the relative velocity would be zero. Where values of tag motion based on readings from antennas 445 corresponded with forklift motion, the tag being read would be non-moving, and considered to be a stray. Where the decision component 460 considers e.g. tag velocity and tag acceleration, a tag on another forklift moving at similar speed could be distinguished based e.g. on its different acceleration.

One example according to FIG. 4 would involve the transmission of the backrest and load motion information such as tri-axial acceleration components from a tri-axial accelerometer to the input component 430 which would compute scalar quantities for velocity, acceleration and/or jerk, and/or the vector values for velocity, acceleration and/or jerk, to be compared by means of decision component 460 with corresponding calculated tag values (e.g. of scalar velocity, acceleration and/or jerk, and/or the vector values for velocity, acceleration and/or jerk) obtained from the calculator component 435. Components 430, 435 and 460 may be part of the RFID reader system, or a part of a forklift computer system connected with the RFID reader, for example.

Exemplary Operation of FIGS. 3 and 4

The system 310 of FIG. 3 may have provision for receiving a first signal at a suitable time before a forklift 320 is to come within the field of antennas 345. The timing of the first signal preferably should be such as to activate the reader 340 so as to provide the time needed to identify any RFID tags within its field that should be classified as strays prior to arrival of the forklift load at the field of antennas 345. For example, for a portal system at a loading and unloading dock, the system 310 may receive an alert signal from a cargo management subsystem such as shown in incorporated published patent application US 2007/0213869 A1 as soon as a truck arrives which is to be unloaded via the portal system or as soon as an empty truck trailer is in position to be loaded via the portal system.

In one example, the tags identified as strays by the portal system may be silenced so as not to respond to the readers 340 and 440 during successive traverses of the reader field by the forklift loads during the loading or unloading process. In this way, readers 340 and 440 are given more time to identify and evaluate tags that are likely to be part of the forklift load.

The system 310 may receive a second signal as each forklift load nears the portal field, and in response to this signal, the reader 340 takes tag readings to enable the decision component 360 to evaluate whether the tag motion matches the information on the actual motion of the forklift which is received at input component 330. After traverse of the portal field by the first forklift load, the portal system can receive a third signal that the forklift load has passed the portal field, and reader 340 can be operated to detect the presence of any further stray tags in its field. The second and third signals may be generated by forklift position sensors such as described with reference to FIG. 1.

During loading and unloading operations, the forklift antennas 445 may continually take readings from the on-board tags 415 (e.g. using a different session of the EPC Gen 2 protocol than the session used by the portal reader). As described in the incorporated published patent application US 2009/0207024 A1, the readings by reader 440 may be utilized to determine whether identified tags are within the limits of the load space and are true positive tags, or whether the tags exhibit motion relative to the antennas 445 and thus are stray tags.

Particularly where there are a large number of tags in each load, so that the portal reader cannot fully evaluate each tag in is field, it is advantageous to have tags identified by means of the forklift antennas as true positive tags, silenced prior to such true positive tags reaching the portal reader field, so as to not respond to the portal reader 340.

Instead of the portal system 310 silencing strays to prevent their responding to the forklift reader 440, the list of such strays can be sent by the portal system to the forklift system so that the forklift system can identify the listed tags as strays without requiring analysis of their location or relative velocity.

Instead of the forklift system 410 silencing true positive tags to prevent their responding to the portal system, the list of such true positive tags can be sent by the forklift system to the portal system so that the portal system can identify the listed tags as true positives without requiring analysis of their motion parameters or their location.

Figure 9:
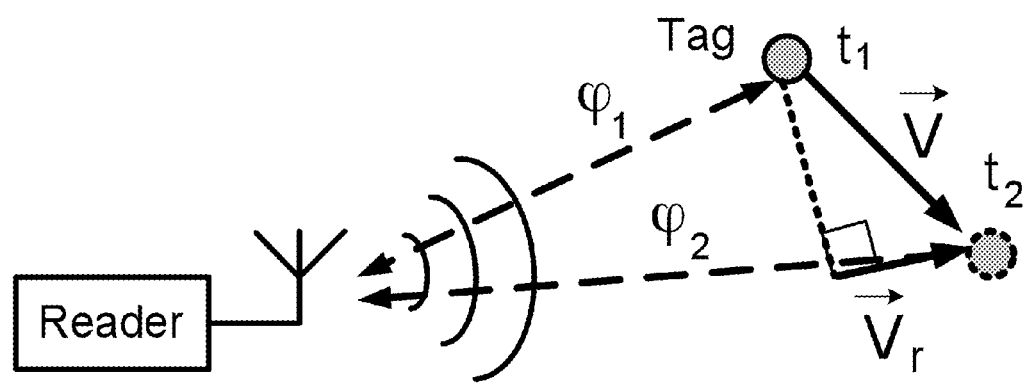
FIG. 9 is a diagrammatic view useful for explaining how tag three-dimensional motion vectors may be obtained, e.g. for use in the embodiments of FIGS. 1-5 and 8.

The forklift reader, e.g. 440, FIG. 4, may operate in a different session from the portal reader such as 340, FIG. 3, so that both readers can operate simultaneously With respect to the processing carried out by the calculator components 335 and 435, as has been previously pointed out with respect to read tag step 120, FIG. 1, the time domain phase difference of arrival (TD-PDOA) method explained e.g. in section III of the incorporated Nikitin et al technical paper of April 2010, may be used based on readings from several antennas as explained with reference to FIG. 9. The result obtained for a tag velocity vector can be differentiated with respect to time to obtain the acceleration vector, and the result for the acceleration vector can be differentiated with respect to time to obtain the jerk vector. The entire disclosure including specification, claims and drawings of Nikitin et al application Ser. No. 12/495,732 filed Feb. 13, 2009 is hereby incorporated herein by reference.

Description of FIG. 5

Referring to FIG. 5, a preferred way to determine the distance to the tag in the portal is to use frequency domain phase difference of arrival (FD-PDOA) technique (described in incorporated Nikitin et al April 2010 technical paper and in the incorporated patent application Ser. No. 12/495,732). By doing swept frequency measurements on all four portal antennas (whether they are mounted horizontally as with antennas 2, 5 and 4, 6, FIG. 5 or vertically as with antennas 1, 2 and 3, 4) and taking the phase derivative with respect to frequency, one can do four-angulation: find distances to the tag from each of the four portal antennas e.g. 1-4, FIG. 5, and hence calculate where the tag is. To better calculate the derivative, it it best to take measurements at all available frequency channels. This will increase the time spent reading each individual tag but will provide better ranging information. Also, multipath has an effect on the accuracy (as described in the Nikitin technical paper, Section IV, for the case of two antennas), but doing this on all four antennas, e.g. 1-4, FIG. 5, will allow to overcome some of the multipath problems. This method is analogous to FM-CW radar ranging with several different antennas.

Regarding the angle to the tag, in general a pair of vertically mounted antennas allows to get vertical bearing, while a pair of horizontally mounted antennas allows to get a horizontal bearing. This technique is referred to us as spacial domain phase difference of arrival (SD-PDOA). The best arrangement is when antennas are not too far away from each other and the reader is bistatic. However, monostatic reader and arbitrarily located antennas also work, just the geometry and calculations become more involved. In the portal setup of the thirteenth figure of the Nikitin et al April 2010 technical paper, the reader was monostatic, and the distance between the horizontal pairs of antennas was several feet (the width of the portal). Even that arrangement theoretically allows to get both horizontal and vertical bearings to the tag. By adding just one more antenna to each side of the portal (shown at 5, 6 in FIG. 5), one could get a reasonable precision of getting the horizontal and vertical bearing to the tag. Antenna pairs 1, 2, and 3, 4 allow to calculate vertical bearing, and pairs 2, 5 and 4, 6 allow to calculate horizontal bearing. As said before, one could use any pair from the set (say, pair 1-6, FIG. 5), but calculations become more involved. Pairs 1, 3, 2, 4, and 5, 6 can also be used but because they are spaced more than a wavelength apart, there will be some ambiguity associated with the phase rollover. With proper calibration, a monostatic reader can be used to get the bearings to the tag.

Also, a very powerful method can be to combine SD-PDOA measurements and FD-PDOA: to do phase measurements on all channels and all antennas, and then apply both techniques and combine the results to find the most likely tag location.

Because TD-PDOA can measure only radial tag speed (relative to the antenna that measures it), it is useful to have such measurement done from several antennas to get the vector of the tag speed and see if this vector coincides with the vector speed of the forklift (obtained from the accelerometer based speed sensor on the forklift backrest)—i.e. not only to see that the tag in question moves at say seven miles per hour (7 mph) and the forklift moves at seven miles per hour (7 mph), but also to see that they move in the same direction. This would allow one to conclude with higher degree of credibility that the tag is on the forklift.

With the Gen2 RFID protocol, one can read 1000 tags per second on a single antenna at a single frequency, and with proper (fast) antenna switching, one can measure angle to the tag in a fraction of a second. Similarly, to get the range to the tag (FD-PDOA technique), one needs to do a few frequencies, but even if 50 frequencies are used, we still are talking about 20 tags per second, ½₀ second per tag.

The disadvantage of the bistatic reader is the large number of antennas required (e.g. four on each side with three receive antennas, e.g. two, three, four, on each side as in figure sixty-two of incorporated application Ser. No. 12/765,865 filed Apr. 23, 2010, hereafter incorporated figure sixty-two) and the need for a bistatic reader.

The setup shown in the thirteenth figure in the incorporated paper by Nikitin et al, April 2010 may be a standard portal setup, which is a big advantage. Such or a similar portal is used by many warehouse companies and requires only a monostatic reader. See Nikitin et al incorporated patent application "Method and System to Determine the Orientation, Size, Position, and Movement of RFID Tagged Objects", U.S. patent application Ser. No. 12/495,732, for an explanation of preferred modes of operation of the antenna system of the incorporated figure thirteen.

Re FIG. 5 and incorporated figure sixty-two, if one wants to get a horizontal and vertical bearings to the tag, there can be on each side:
  1 Tx, 3 Rx antennas (e.g. incorporated figure sixty-two—assumes a bistatic reader), or
  1 Tx/Rx, 2 Rx antennas (e.g. FIG. 5—if a bistatic reader is used), or
  3 Tx/Rx antennas (e.g. FIG. 5—if a monostatic reader is used).

In general, monostatic readers are simpler, cheaper, and prevailing the on the RFID market. However, the calibration of phase needs to be done more carefully, because if two antennas are used in Tx/Rx mode each, not only the return path from the tag to the reader antennas is different (and contributes to the phase difference), but also the forward paths are different. As a result, the tag may receive different amounts of power from different antennas and hence have additional phase offsets.

Figure 6:
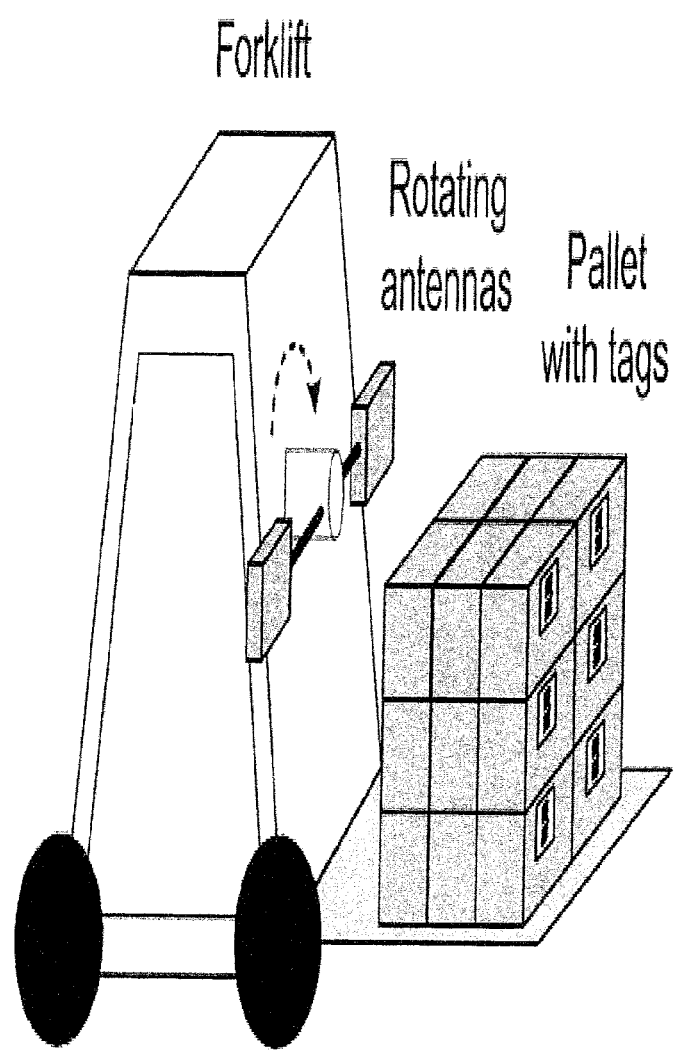
FIG. 6 shows a mechanical embodiment for continuously changing the antenna pattern of the reader antennas e.g. while the antennas move with a forklift truck.
Figure 7:
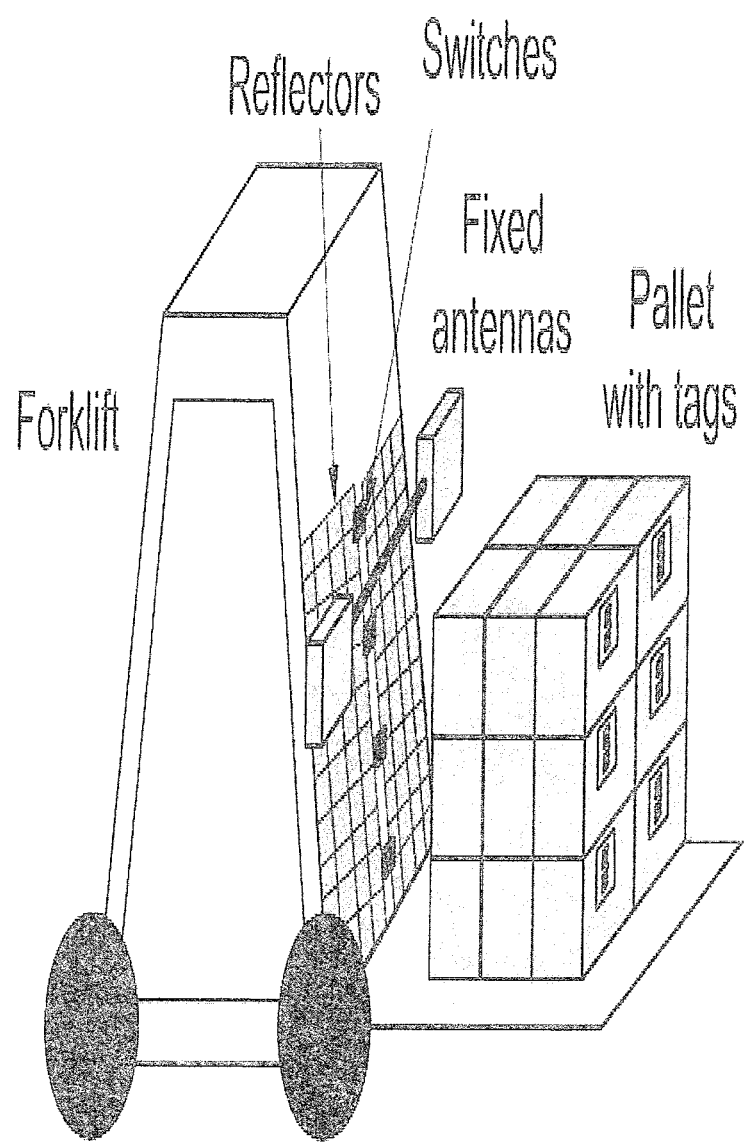
FIG. 7 shows an electronic embodiment for continuously changing the antenna radiation pattern as seen by the tags on the pallet, with non-rotating "fixed" reader antennas, e.g. which may be moving with the forklift vehicle.

Description of FIGS. 6 and 7

Necessity to deliver enough RF power to passive RFID tags is the main factor that influences the ability to read all tags on a pallet carried by RFID equipped forklift. Because of the challenging RF environment and various possible tag antenna patterns, multiple antennas are usually mounted on the forklift. A typical number is two. See e.g. incorporated US 2007/0213869 A1. Even with two antennas, it is hard to achieve 100% identification rate for tags on a pallet. Antenna patterns, whether it is a tag antenna or a reader antenna, are complicated and greatly affected by RF environment. Some tags can be read from one direction, some from another. Moving a reader antenna by a few inches or bringing a reflecting object nearby can cause additional reads.

In order to increase true positive reads on a forklift, it is proposed to continuously change the antenna pattern of the reader antennas (with respect to each individual tag antenna) while reading. This can be done mechanically or electronically. An example of a mechanical implementation is rotating a pair of reader antennas as shown in FIG. 6. In an electronic example, a few reflectors (which can be made of solid metal or from a metal mesh, with cell size less than half a wavelength) can be placed near reader antennas and connected to each other using switches (e.g. PIN diodes), as shown in FIG. 7. Activating or deactivating those switches will short/open the reflector connections, delivering the result of a successive shifting of the radiation pattern of reader antennas as seen by the tags on the pallet. The reflectors can also be placed underneath the pallet or on the sides.

The arrangements of FIGS. 6 and 7 can also be used for portal antennas to continuously change the antenna pattern in the path of a forklift load of tagged items through a portal.

By way of example, in FIG. 6, a rotary encoder rotating with the antennas may encode successive discrete angular positions where a reading operation takes place. The pairs of readings taken at each successive angular position are then processed as separate antenna readings. In FIG. 7, the successive antenna radiation patterns may be assigned successive code numbers, and the readings taken for each antenna radiation pattern are then processed as separate antenna readings.

The antenna systems of FIGS. 6 and 7 may be used as the forklift antenna system and/or the portal antenna system described with reference to FIGS. 2A, 2B and 2C, and may be used for antennas 345, FIG. 3, 445, FIG. 4, and in place of antennas 1-6 in FIG. 5. The antenna systems of FIGS. 6 and 7 may also be used for the embodiments disclosed in the incorporated published patent application US 2009/0207024 A1.

Figure 8A:
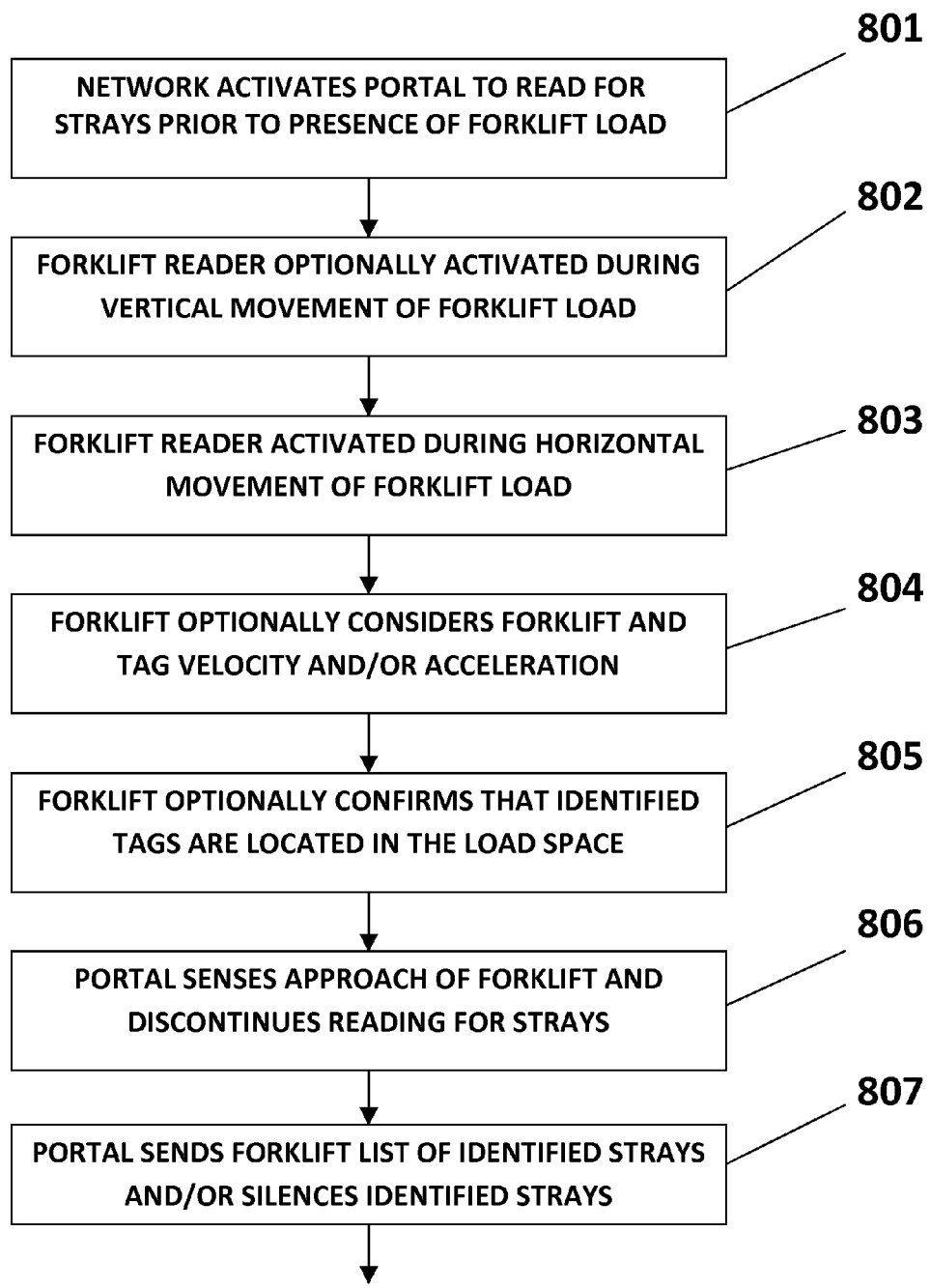
FIGS. 8A and 8B show an exemplary sequence of processing steps for identifying tags that are part of the forklift load e.g. as the load moves from a staging area past a portal reader system and is loaded onto a transport vehicle.
Figure 8B:
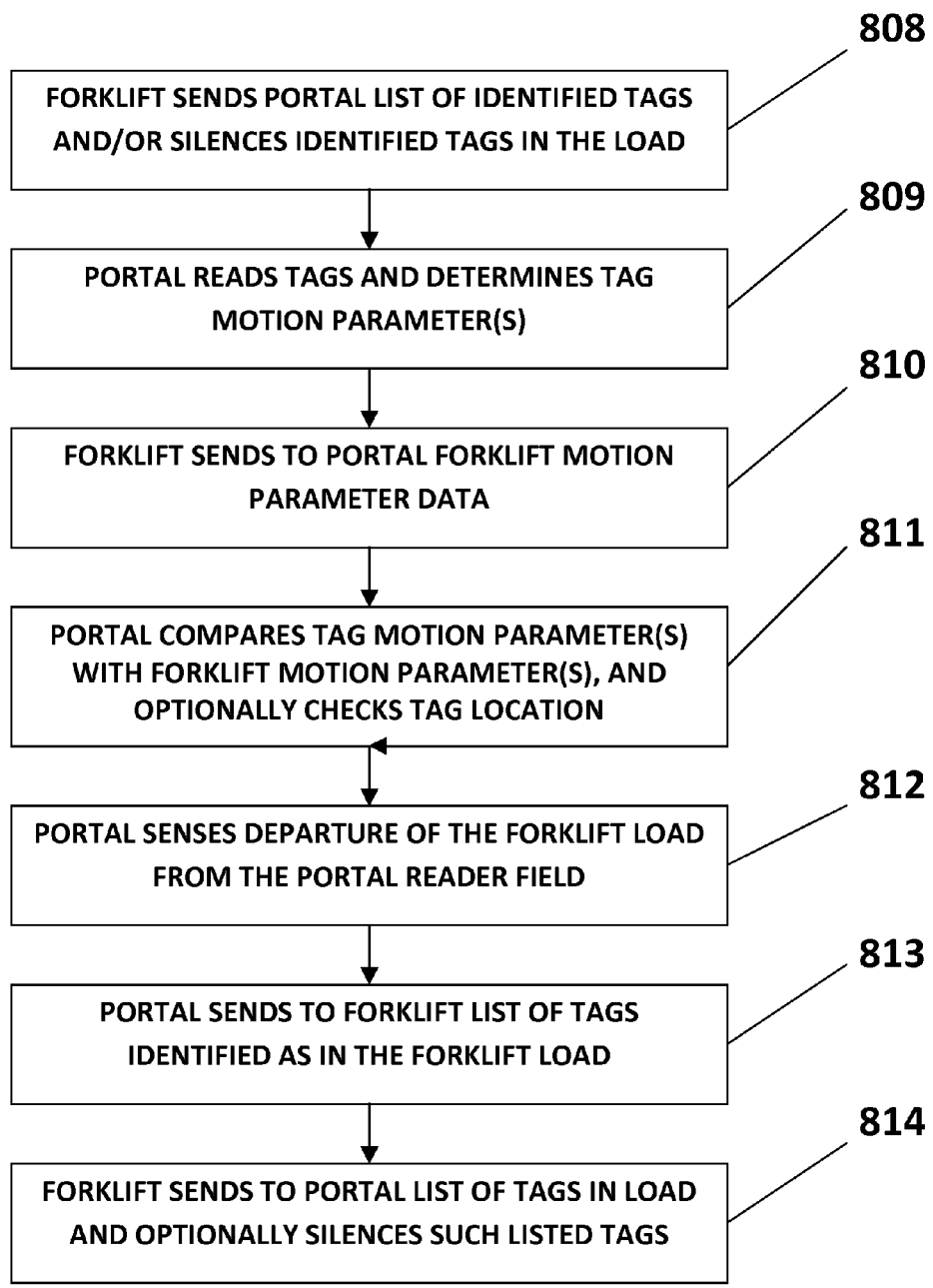

Description of FIGS. 8A and 8B (1) Portal Reader Reads Stray Tags Prior to the Arrival of the Forklift Load, Step 801

In a preferred arrangement, a cargo management subsystem (such as 108 in incorporated US 2007/0213869) would activate the portal reader, e.g. 340, FIG. 3, as soon as feasible prior to the time that a forklift with given ID would arrive in the vicinity of the portal. This would activate the portal reader to read stray tags prior to the forklift load coming into the portal reader field.

(2), (3) in a Preferred Mode of Operation, the Forklift Reader is Active During Vertical Movement of the Forklift Load, Step 802, FIG. 8A, as Well as During Horizontal Movement per Step 803.

In one example, the reader 440 may be activated as a pallet of tags is raised vertically by the forks of the forklift. An advantage is that a vertical component of motion is generally more distinctive, since adjacent tags tend to be stationary or only moving horizontally. Thus vertically moving tags with a zero vertical component of velocity relative to the antennas 445, are likely to be tags which are part of the forklift load.

As an extension, as the forklift moves through the portal, it may stop at one point, and have all tags on the forklift (whole load) moved up and down (or forward/backward) by a certain distance (e.g. 1.0 foot) N times during a given time interval T. The forklift can do that by driving back/forth, or lifting/lowering the load. The reader then looks for the tags whose phase and RSSI fluctuate periodically with frequency N/T. This would help to identify which tags are the tags of interest. Tags in the load may be moved in one direction for one half wavelength to get the phase calibration.

(4) the Forklift, e.g. of FIG. 4, Preferably Considers Forklift and Tag Velocity, and May Also Compare Forklift and Tag Acceleration and/or Jerk Per Step 804

Where the antenna system moves with the load, it is advantageous to obtain quantitative velocity values for forklift velocity and for tag velocity based on tag readings. For example, the tags in the load should have zero quantitative velocity value relative to the antenna system, so that tags found to have quantitative velocity values somewhat above zero, could be regarded as questionable as to true positive status; such tags of questionable status could be further evaluated e.g. by repeating the calculation of quantitative velocity based on further tag readings by the forklift antenna system.

In a robotic system, for example, the velocity of forklifts in adjacent portals may be selected so as to be different, so that moving tags in adjacent portals can be identified by their velocity values relative to the forklift antennas. Other moving tags can be expected to have different directions of their velocity vectors.

The advantage of considering tag acceleration and/or jerk has been explained with reference to FIGS. 2A, 2B and 2C.

(5) the Forklift Reader System May Confirm that Identified Tags are Located in the Load Space Per Step 805

Reference is made to the first figure of incorporated published application US 2009/0207024 A1 (e.g. decision block 130, paragraph [0024]), and the incorporated Nikitin et al patent application Ser. No. 12/495,732 filed Feb. 13, 2009.

(6) the Portal Senses the Approach of the Forklift and Discontinues Reading for Strays Per Step 806

An active RFID tag or a battery powered passive tag mounted on the forklift could be used to signal that a specific forklift is approaching the portal reader field. When the portal reader is activated by the cargo management subsystem, the portal reader can periodically send interrogation signals addressed to the active or battery powered RFID tag on the approaching forklift, so that as soon as the RFID tag is in the field of the portal reader, the portal reader will receive a response from the RFID tag and discontinue evaluating for stray tags in the portal field region. The range of the active or battery powered tag exceeds that of an ordinary passive tag, so passive tags in the forklift load will not be sensed by the portal reader at the time that the active or battery powered tag responds to the portal reader.

(7) the Portal Sends to the Forklift a List of Identified Stray Tags and/or Silences the Identified Strays Per Step 807

Each time the forklift approaches the portal, the portal system may send to the forklift computer e.g. via the cargo management subsystem, a list of stationary stray tags so that such stray tags would not need to be evaluated by the forklift (e.g. by computing their velocity or location relative to the forklift antennas). Ideally the portal reader system would measure the range to identified stationary stray tags, and silence stationary stray tags within a selected perimeter about the portal reader installation so that such stray tags would not be read by the forklift reader as it approached the vicinity of the portal reader. If the forklift reader is operating on a different session than the portal reader (so that both could operate simultaneously), the portal reader might silence the stationary stray tags within the selected perimeter for both sessions during the time interval that the forklift was traversing the portal reader field.

(8) the Forklift Sends to the Portal System a List of Tags Identified as being in the Forklift Load, and/or Silences Such Identified Tags For example, when the forklift system receives the list of stationary strays per Step 807, the forklift system may send to the portal system a list of tags in the load so that the portal system does not need to spend time evaluating already identified tags (e.g. evaluating the motion of such tags and their path of movement). Ideally, the tags identified by the forklift system as part of the load would be silenced prior to arrival of the forklift load at the portal field, so that the portal system would not have to deal with such already identified tags. One method for silencing tags is to define bits in memory on the tag that indicate that the tag has been read and identified by the forklift reader system as being part of the load.

(9), (10) and (11) the Portal Reader System Obtains the Tag and Forklift Motion Parameters as the Forklift Load Traverses the Portal Reader Field Per Steps 809 and 810, and Compares Such Parameters Per Step 811, and May Also Check that Identified Tags are within the Path of the Forklift Load Per Step 811

Where the speed of the forklift and thus the speed of the tags in the load can be preset to a specific quantitative value, or measured to obtain specific quantitative velocity values relative to the stationary reader reading them, then more certainty can be given to a comparison with the calculated speed as derived by the stationary reader from the phase difference of arrival information. For example if the speed of the forklift is known by the portal to be 1.0 mile per hour and the multiple phase measurements by the portal reader of the tag also produce a computed speed of 1.0 mile per hour, then it is known with more certainty that the tag is indeed a true positive moving through the portal.

A microprocessor in the forklift computer could have the capability of sampling the forklift accelerometer output at a much higher rate than could be transmitted to the portal reader system (which is limited by the RF air protocol). The forklift processor and the portal computer could have synchronized real time clocks so that the batch accelerometer data sent to the portal reader system e.g. via the cargo management subsystem could be correlated with tag motion parameters as computed at the portal (based on tag readings by the portal reader).

Exemplary processing at the portal reader system has been discussed in relation to FIGS. 2A, 2B and 2C, and FIG. 3, and in the Exemplary Operation of FIGS. 3 and 4. Checking that identified tags are within the path of the forklift load can utilize triangulation as described in the incorporated published patent application US 2009/0207024 A1 at paragraph [0024]. With a one-axis forklift accelerometer, the forward motion of the forklift along the straight path through the portal would be represented as the acceleration of the forklift load in the forward direction. With a second, or a second and third, accelerometer axis, the vertical motion of the forklift load could be included in the resultant load acceleration vector. The load velocity vector would be obtained as the time integral of the load acceleration vector. Where the velocity of the forklift is measured by a speed gauge associated with the portal, the load velocity vector would be obtained directly, and the time derivatives would give the acceleration and jerk vectors for the load.

(12) the Portal Senses the Departure of the Forklift Load from the Portal Reader Field Any suitable sensor may be used to determine when the portal reader should discontinue reading for tags in the forklift load, e.g. a photoelectric ("electric eye") system, or a pneumatic tube or a mechanical treadle actuated by the weight of the forklift. It is useful to discontinue operation of the portal reader when the forklift load is out of range of the portal field, since reflection of the portal field by the forklift may only serve to cause the reading of stray tags not otherwise within the portal field.

(13) the Portal Sends to the Forklift System a List of the Tags Identified as being in the Forklift Load As the forklift load leaves the portal reader field, the portal reader may send to the forklift the portal list of true positive tags to confirm forklift-identified true positive tags, or to reduce tag processing time by the forklift. In some situations, the portal reader system may send to the forklift e.g. via the cargo management subsystem a list of true positive tags that the portal reader system had confirmed were moving according to the forklift motion parameters, and were located at the path of the forklift load through the portal field, e.g. so that the forklift reader would not need to evaluate any such true positive tags (during forklift movement beyond the portal reader field).

(14) the Forklift System Sends to the Portal a List of Tags in the Load and/or May Silence the Tags Found to be in the Load In some situations, the forklift reader system could send its list of true positive tags to the portal system via the cargo management subsystem, e.g. so that a later reading by the portal reader of an already loaded tag could be recognized as being such and thus being spurious. Tags identified as true positive tags and deposited in the trailer could be silenced for the remaining duration of the loading operation, e.g. so as not to be readable by the forklift reader or the portal reader. Once a tag has been placed in the truck for instance, then a bit could be set on the tag by the forklift reader indicating that the tag already was on the trailer. The portal reader and the forklift reader would then would only read tags which didn't have that bit set. The portal reader and the forklift reader would not waste time re-identifying tags that are not of interest since they have already been processed.

In an ideal situation, where the total number of tags in each forklift load is known, vertical movement of the load at deposit e.g. in a truck trailer might serve to locate any missing tags. If not, a special reading booth or a special forklift might be used e.g. equipped with rotary antenna systems such as shown in FIGS. 6 and 7, either on a forklift as shown or at a stationary location. The incorporated Nikitin et al published patent application US 2008/0111688 A1 shows antennas (such as 306) above the RFID tag. Such an antenna or antennas could be located on a forklift above the forklift load region, or e.g. at the sides of the forklift load region, or in the ceiling e.g. over the staging area where the forklift load is moved vertically, or over the path of the forklift through the portal, to insure that all tags in a load are adequately activated. Plural portal systems along the path of a load, e.g. with a separation of at least eight feet, might be utilized. Such separated portal systems might have different configurations of antennas, e.g. one like FIG. 5, and one with overhead antenna.

Description of FIG. 9

FIG. 9 illustrates the time domain phase difference of arrival (TD-PDOA) technique and corresponds with the fourth figure of the incorporated Nikitin et al technical paper of April 2010. By measuring the phase of the tag signal at two different time moments $t_1$ and $t_2$ (with a fixed frequency), the tag radial velocity vector $V_r$ can be calculated as explained in the incorporated Nikitin et al technical paper. With the use of three antennas, one used for transmit and receive, three tag radial velocity vector components of the tag three-dimensional velocity vector V are obtained from which the tag three-dimensional velocity vector V can be calculated. The derivative with respect to time of the tag three-dimensional velocity vector V will give the tag three-dimensional acceleration vector, and the derivative with respect to time of the tag three-dimensional acceleration vector will give the tag three-dimensional jerk vector.

In another way of determining tag three-dimensional velocity vector, tag location at points $t_1$ and $t_2$ in FIG. 9 can be determined, e.g. with coordinates x1, y1, z1 and x2, y2, z2 using frequency domain phase difference of arrival (FD-PDOA) or spacial domain phase difference of arrival (SD-PDOA), with three antennas, one used for transmit and receive. The expression for the tag three-dimensional velocity vector is:

$$[V_x, V_y, V_z] = [(x2-x1)/(t2-t1), (y2-y1)/(t2-t1), (z2-z1)/(t2-t1)].$$

The TD-PDOA approach is preferred because it requires less processing and is less prone to errors—the radial velocity vectors are obtained directly from the phase derivatives. In both the TD-PDOA technique and the FD-PDOA and SD-PDOA techniques, the three antennas must be spatially separated and must not lie on the same line. Examples of such antenna configurations are figure seven A of the incorporated Nikitin et al patent application Ser. No. 12/495,732 and FIG. 5 herein. Forklift backrests may have three or more antennas for carrying out the TD-PDOA, FD-PDOA and SD-PDOA approaches explained above; for example the load backrest of the fifth figure of incorporated published application 2007/0213869 A1 has four antenna placement zones. The forklift and portal arrangements of FIGS. 6 and 7 may have three or more antennas for carrying out the TD-PDOA, FD-PDOA and SD-PDOA approaches explained above, for example three antennas at equal 120 degree intervals.

Spatial identification technology (SID) may be used to define a space in front of a forklift as a "load space," where the load space may be either a certain volume or area in front of the forklift. Packages within that volume or area in front of the forklift are considered on the load, while packages outside of that area are considered not on the load. SID may also be used to detect when a tagged item is in motion and a tagged item's location relative to the reader antenna. SID may include, but is not limited to, traditional motion sensors using infrared light or laser technology, vibration sensors, gyroscopes, and accelerometers. SID may be built into an RFID reader system or alternatively be a separate system or sensor (e.g., be built within a vehicle).

The following documents discuss SID in greater detail and are incorporated by reference: (1) U.S. Pat. No. 6,600,443, entitled, "Method and Apparatus to Determine the Direction to a Transponder in a Modulated Backscatter Communication System", filed Oct. 18, 2002; (2) U.S. Pat. No. 6,476,756, entitled, "Method and Apparatus to Determine the Direction to a Transponder in a Modulated Backscatter Communication System", filed Jun. 4, 2001; (3) PCT Publication No. WO 2007/035833, entitled, "Method, Apparatus, and System for Selecting and Locating Objects Having Radio Frequency Identification (RFID) Tags; (4) "Phase Based Spatial Identification of UHF RFID Tags" by Nikitin, Martinez, Ramamurthy, Leland, Spiess, and Rao, presented at the IEEE RFID Conference at Orlando, Fla., Apr. 14-16, 2010 (Available to the public via IEEEXplore—identifier code 978-1-4244-5744-1/10/$26, copyright 2010 IEEE); and (5) "Method and System to Determine the Orientation, Size, Position, and Movement of RFID Tagged Objects", U.S. patent application Ser. No. 12/495,732 filed Feb. 13, 2009.

The words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while an RFID reader for reading RFID tags are mentioned, any reading apparatus for reading devices emitting radio-frequency signals may be used under the principles disclosed herein.

The teachings of the invention provided herein can be applied to other systems, not necessarily the system described above. The elements and acts of the various embodiments described above can be combined to provide further embodiments.

While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

The invention claimed is:

1. A system comprising,
a mobile RFID system which moves with at least one load tag in a load; and
a fixed RFID system that reads field tags in a field of the fixed RFID system;
wherein the mobile RFID system determines the at least one load tag is in the load by comparing motion parameters of scanned tags read by the mobile RFID system and motion parameters of the field tags read by the fixed RFID system.

2. The RFID system according to claim 1, wherein said fixed RFID system receiving motion parameter information concerning the movement of said mobile RFID system, and utilizing the motion parameter information to aid in distinguishing between tags moving with the load, and extraneous tags which are not part of the load.

3. The RFID system according to claim 1, wherein said fixed RFID system receiving motion parameter information concerning the movement of said mobile RFID system, and utilizing the motion parameter information in the form of a value representing velocity of the load to aid in distinguishing between tags moving with the load, and extraneous tags which are not part of the load.

4. The RFID system according to claim 1, wherein said fixed RFID system receiving motion parameter information concerning the movement of said mobile RFID system, and utilizing the motion parameter information in the form of a value representing acceleration of the load to aid in distinguishing between tags moving with the load, and extraneous tags which are not part of the load.

5. The RFID system according to claim 1, wherein said fixed RFID system receiving motion parameter information concerning the movement of said mobile RFID system, and utilizing the motion parameter information in the form of a value representing rate of change of acceleration of the load to aid in distinguishing between tags moving with the load, and extraneous tags which are not part of the load.

6. The RFID system according to claim 1, wherein said fixed RFID system receiving motion parameter information concerning the movement of said mobile RFID system, and utilizing the motion parameter information in the form of a vector value to aid in distinguishing between tags moving with the load, and extraneous tags which are not part of the load.

7. The RFID system according to claim 1, wherein said fixed RFID system receiving motion parameter information concerning the movement of said mobile system, and utilizing the motion parameter information in the form of a vector value having at least a substantial vertical component reflecting movement of the load with at least a substantial vertical component, to aid in distinguishing between tags moving with the load, and extraneous tags which are not part of the load.

8. The RFID system according to claim 1, wherein said fixed RFID system utilizing its antenna system while the load is not in its field to identify the field tags which are not part of the load.

9. The RFID system according to claim 1, wherein said fixed RFID system silencing the identified field tags that are not part of the load so that the identified field tags do not respond to the mobile RFID system.

10. The RFID system according to claim 1, wherein said mobile RFID system utilizing its mobile antenna system while the load is not in the field of the fixed RFID system to identify tags which are part of the load, and to silence the identified tags that are part of the load so that the identified tags do not respond to a request from the fixed RFID system.

11. A RFID system, comprising:
  a reader system that reads field tags in a field of the reader system; and
  a decision system providing a decision as to whether the read field tags represent a load tag indicating the load tag is on a load of a moving vehicle or an extraneous tag indicating the extraneous tag is not on the load of the moving vehicle based at least in part on information derived from comparison of movements of the read field tags and movements of the load tags.

12. The RFID system according to claim 11, wherein said decision system further receiving quantitative motion information representing the motion of the load tag for comparison with the information based on the read field tags.

13. The RFID system according to claim 11, wherein said decision system comparing derived quantitative value information representing a time derivative of tag velocity based on tag readings with quantitative motion information representing a corresponding time derivative of velocity for the load tag.

14. The RFID system according to claim 11, wherein said decision system further receiving quantitative motion information as a vector representing the motion of the load tag for comparison with the corresponding vector of the information based on the read field tags.

15. The RFID system according to claim 11, wherein said decision system comparing derived quantitative value information representing as a vector a time derivative of tag velocity based on tag readings with quantitative motion information representing as a vector the corresponding time derivative of velocity for a load tag.

16. The RFID system according to claim 11, wherein said decision system further receiving quantitative motion information as a vector representing the motion of a load tag with at least a substantial component of vertical motion, for comparison with the corresponding vector of the derived quantitative value information based on the read field tags.

17. The RFID system according to claim 11, wherein said antenna system comprising one or more antennas having a rotary component of motion.

18. The RFID system according to claim 11, said antenna system comprising one or more antennas having a successively shifting field pattern.

19. A method of distinguishing a radio frequency identification ("RFID") tag within a load of a vehicle from an extraneous tag, said method comprising:
  moving the load of the vehicle through a field of a RFID reader system, wherein the load comprises items that each have load RFID tags;
  obtaining, from an RFID system of the vehicle, a load motion parameter which is a function of the movement of the load;
  reading, using the RFID reader system, field tags within the field of the RFID reader system during movement of the load through the field of the RFID reader system; and
  comparing load motion information for the load based on the load motion parameter with tag motion information derived from the tag readings.

20. The method according to claim 19, wherein said load motion information and said tag motion information representing corresponding time derivatives of velocity.

* * * * *